(12) United States Patent
Winslow et al.

(10) Patent No.: US 8,786,117 B2
(45) Date of Patent: Jul. 22, 2014

(54) WIND TURBINE SENSOR ASSEMBLY AND METHOD OF ASSEMBLING THE SAME

(75) Inventors: Christopher James Winslow, Esperance, NY (US); Stefan Herr, Greenville, SC (US); Mark West, Hjellestad (NO); Alexander Kimberley Simpson, Munich Bavaria (DE); Ryan Michael LeClair, Wilton, NY (US)

(73) Assignee: General Electric Company, Schenectady, NY (US)

( * ) Notice: Subject to any disclaimer, the term of this patent is extended or adjusted under 35 U.S.C. 154(b) by 1493 days.

(21) Appl. No.: 12/139,157

(22) Filed: Jun. 13, 2008

(65) Prior Publication Data

US 2009/0309359 A1 Dec. 17, 2009

(51) Int. Cl.
*F03D 11/00* (2006.01)
*G01D 11/30* (2006.01)
*F04D 29/38* (2006.01)
*G01P 5/02* (2006.01)

(52) U.S. Cl.
USPC .................. 290/44; 416/44; 416/61; 73/866.5

(58) Field of Classification Search
USPC .......................... 416/44, 61; 290/44; 73/866.5
See application file for complete search history.

(56) References Cited

U.S. PATENT DOCUMENTS

| | | | |
|---|---|---|---|
| 3,646,811 A | 3/1972 | DeLeo et al. | |
| 4,163,387 A | 8/1979 | Schroeder | |
| 5,337,602 A | 8/1994 | Gibson | |
| 6,361,275 B1 | 3/2002 | Wobben | |
| 6,412,343 B1 * | 7/2002 | Jefferson | 73/182 |
| 6,461,106 B1 | 10/2002 | Rahier | |
| 7,347,668 B2 | 3/2008 | Pedersen | |
| 7,883,319 B2 * | 2/2011 | Volkmer | 416/61 |
| 2006/0145483 A1 | 7/2006 | Larsen et al. | |
| 2007/0041834 A1 | 2/2007 | Schram et al. | |
| 2009/0039650 A1 * | 2/2009 | Nies | 290/44 |
| 2009/0304505 A1 * | 12/2009 | Wobben | 416/1 |
| 2010/0087960 A1 * | 4/2010 | Hayashi et al. | 700/287 |

FOREIGN PATENT DOCUMENTS

GB 2067247 7/1981
WO 2005093435 A1 10/2005

OTHER PUBLICATIONS

Danish Patent and Trademark Office, Search Report for Application No. PA200900719, Jan. 15, 2010, 4 pages, Denmark.
Maeda, T. et al., "Surface Pressure Measurement on a Rotating Blade of Field Horizontal Axis Wind Turbine in Yawed Condition," JSME International Journal, Series B, vol. 48, No. 1, 2005, pp. 156-163.

* cited by examiner

*Primary Examiner* — Angel Roman
(74) *Attorney, Agent, or Firm* — James McGinness; Armstrong Teasdale LLP (57) ABSTRACT

A sensor assembly for use with a wind turbine rotor blade is provided. The sensor assembly includes an air data probe including a base shaft, a tip, and a rod portion extending therebetween, wherein the rod portion is fabricated from a composite material. The sensor assembly includes a receptacle configured to couple within the leading edge of the rotor blade for receiving the base shaft therein such that the tip extends a distance from the leading edge when the base shaft is received within the receptacle.

20 Claims, 7 Drawing Sheets

WIND TURBINE SENSOR ASSEMBLY AND METHOD OF ASSEMBLING THE SAME

BACKGROUND OF THE INVENTION

The field of the invention relates generally to wind turbines, and more particularly to blade-mounted sensor assemblies.

At least some known wind turbines include a plurality of blades that are used to convert kinetic energy from on-coming wind to mechanical energy for use in producing electrical power. Dynamic loading in the form of turbulence, wind shear, yaw error operation, tower shadow, and/or wake effects, may result in inducing varying aerodynamic forces on the blades during rotation, which over time may cause premature fatiguing of components.

Some known wind turbines have been equipped with blade-mounted sensors, i.e. anemometers, that enable aerodynamic conditions surrounding each blade to be determined during operation such that power production and reduction of unwanted loads upon the wind turbine blade may be optimized. However, known systems are fixedly mounted within the airfoil of the blade such that removal following testing is substantially prevented without damaging the sensor. Additionally, known sensors are fabricated from metallic-based materials that increase sensor weight and that may induce vibration during testing. Such vibrations decrease the accuracy of the test results.

BRIEF DESCRIPTION OF THE INVENTION

In one aspect, a sensor assembly for use with a wind turbine rotor blade is provided. The sensor assembly includes an air data probe including a base shaft, a tip, and a rod portion extending therebetween, wherein the rod portion is fabricated from a composite material. The sensor assembly includes a receptacle configured to couple within the turbine blade leading edge for receiving the base shaft therein such that the tip extends a distance from the turbine blade leading edge when the base shaft is received within the receptacle.

In another aspect, a wind turbine is provided that includes a rotor blade and at least one sensor assembly. The sensor assembly includes an air data probe comprising a base shaft, a tip, and a rod portion extending between the tip and the base shaft, wherein the rod portion is fabricated from a composite material, and a receptacle is configured to couple within the turbine blade leading edge for receiving the base shaft therein such that the tip extends a distance from the turbine blade leading edge when the base shaft is received within the receptacle In yet another aspect, a method of assembling a wind turbine is provided. The method includes fixedly coupling a receptacle within a turbine blade leading edge, wherein the receptacle includes a first end and an opposite second end; fabricating an air data probe that includes a base shaft, a tip and a rod portion extending between the tip and the base shaft, wherein the rod is fabricated from a composite material, and receiving the probe within the receptacle such that the tip extends a distance from the turbine blade leading edge when the base shaft is received within the receptacle.

DETAILED DESCRIPTION OF THE INVENTION

Figure 1:
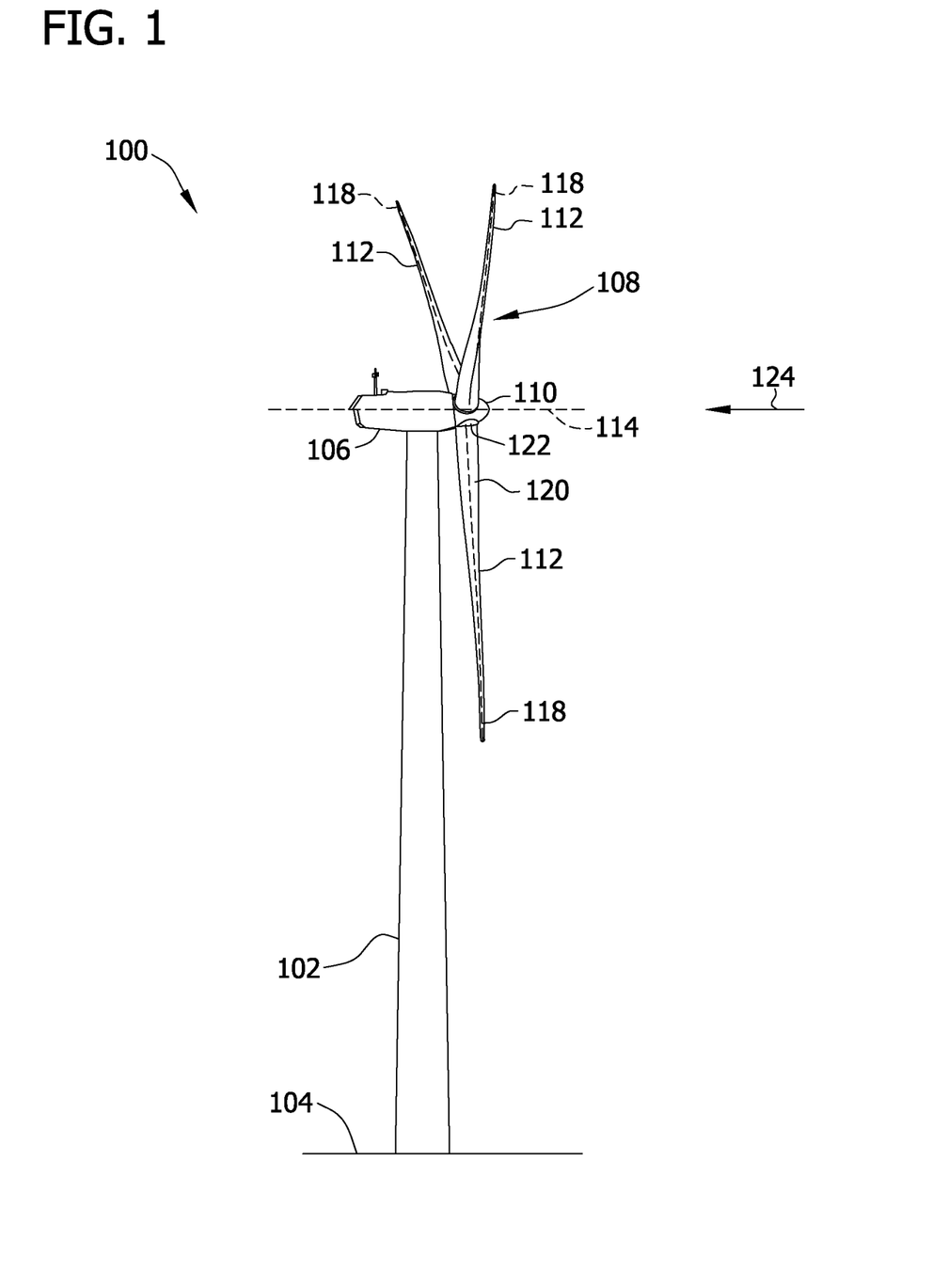
FIG. 1 is a side elevational view of an exemplary wind turbine.

FIG. 1 is a side elevation view of an exemplary wind turbine 100. In the exemplary embodiment, wind turbine 100 is a nearly horizontal-axis wind turbine. In another embodiment, wind turbine 100 may have an up-tilt angle (not shown) ranging from about 1° to about 15°. Alternatively, wind turbine 100 may be a vertical axis wind turbine. In the exemplary embodiment, wind turbine 100 includes a tower 102 that extends from a supporting surface 104, a nacelle 106 mounted on tower 102, and a rotor 108 that is coupled to nacelle 106. Rotor 108 includes a rotatable hub 110 and a plurality of rotor blades 112 coupled to and extending outward from hub 110. In the exemplary embodiment, rotor 108 has three rotor blades 112. In an alternative embodiment, rotor 108 includes more or less than three rotor blades 112. In the exemplary embodiment, tower 102 is fabricated from tubular steel such that a cavity (not shown in FIG. 1) is defined between supporting surface 104 and nacelle 106. In an alternate embodiment, tower 102 is a lattice tower. A height of tower 102 is selected based upon factors and conditions known in the art.

Blades 112 are spaced about rotor hub 110 to facilitate rotating rotor 108 to enable kinetic energy to be transferred from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced to blades 112 are transferred to hub 110 via load transfer regions 122.

In the exemplary embodiment, blades 112 have a length ranging from about 50 feet (ft) (about 15 meters (m)) to about 300 ft (about 91 m). Alternatively, blades 112 may have any length that enables wind turbine 100 to function as described herein. For example, other non-limiting examples of blade lengths include 10 meters or less, 20 meters, and 37 meters. As wind strikes blades 112 from a direction 124, rotor 108 is rotated about an axis of rotation 114. As blades 112 are rotated and subjected to centrifugal forces, blades 112 are also subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines a perspective of blades 112 with respect to the direction of the wind, may be changed by a pitch adjustment mechanism (not shown in FIG. 1) that facilitates increasing or decreasing blade 112 speed by adjusting the surface area of blades 112 exposed to the wind force vectors. Pitch axes 118 for blades 112 are illustrated. In the exemplary embodiment, each blade's pitch is controlled individually. Alternatively, the blade pitch for all blades may be controlled simultaneously.

Figure 2:
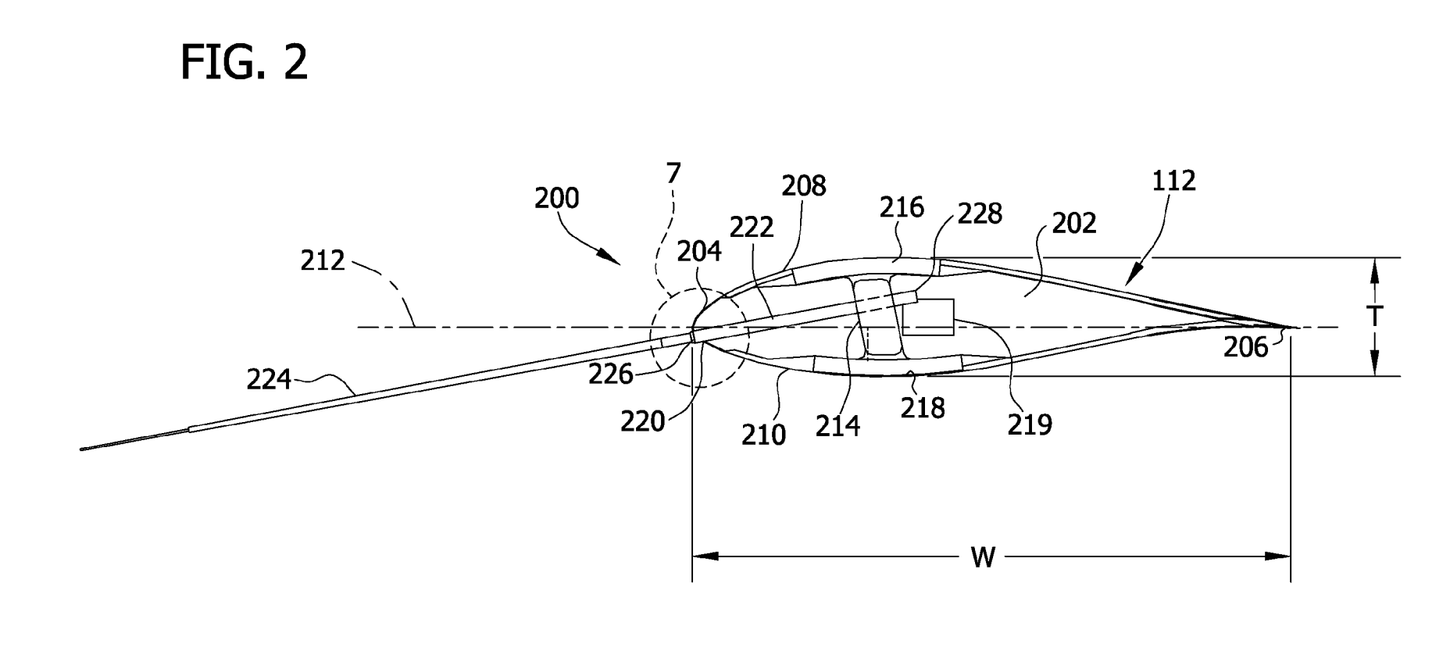
FIG. 2 is a schematic illustration of a wind turbine blade including an exemplary sensor assembly that may be used with the wind turbine shown in FIG. 1.

FIG. 2 is a schematic illustration of wind turbine blade 112 including an exemplary sensor assembly 200 used with wind turbine 100 shown in FIG. 1. Blade 112 includes an airfoil 202 that extends between a leading edge 204 and a trailing edge 206. Blade also includes a low pressure side 208 and a high pressure side 210 that each extend between leading edge 204 and trailing edge 206. A distance between low pressure side 208 and high pressure side 210 defines a thickness T of blade 112, and a distance between leading edge 204 and trailing edge 206 defines a chord width W of blade 112 along a chord line 212. In the exemplary embodiment, chord width W and thickness T are variable along a length (not shown) of blade 112. Blade 112 includes a shear web 214 that extends between load-bearing spar caps 216 and 218 and that is configured to withstand aerodynamic shear loading imparted upon blade 112 during operation. Sensor assembly includes a scanner 219 that is positioned within blade 112 to receive pressure data for use in determining various fluid flow properties around blade 112, as described in more detail herein.

Sensor assembly 200 includes a receptacle 222 that is coupled within blade 112 and that is sized and oriented to receive a probe 224 extending outwardly from blade leading edge 204 through an aperture 220. More specifically, receptacle 222 includes a first end 226 that extends through aperture 220 and that is oriented to receive probe 224 therein. More specifically, aperture 220 is positioned such that receptacle first end 226 extends from blade leading edge 204 at an angle α measured between blade high pressure side 210 from chord line 212. In the exemplary embodiment, angle α is approximately 6°. Alternatively, receptacle first end 226 extends from blade 112 at any angle α that enables sensor assembly 200 to function as described herein. Shear web 214 includes an aperture (not shown) defined therein that is sized and oriented to receive a receptacle second end 228. More specifically, in the exemplary embodiment, receptacle second end 228 is received within the shear web aperture and is securely coupled therein using fiberglass fabric and resin. Alternatively, receptacle second end 228 may be securely coupled to shear web 214 using any adhesive or other known fastening mechanism that enables sensor assembly 200 to function as described herein. Receptacle second end 228 is positioned in flow communication with pressure scanner 219 via a plurality of tubes (not shown) that channel data regarding fluid flow properties gathered from around blade 112, as described in more detail herein.

Figure 3:
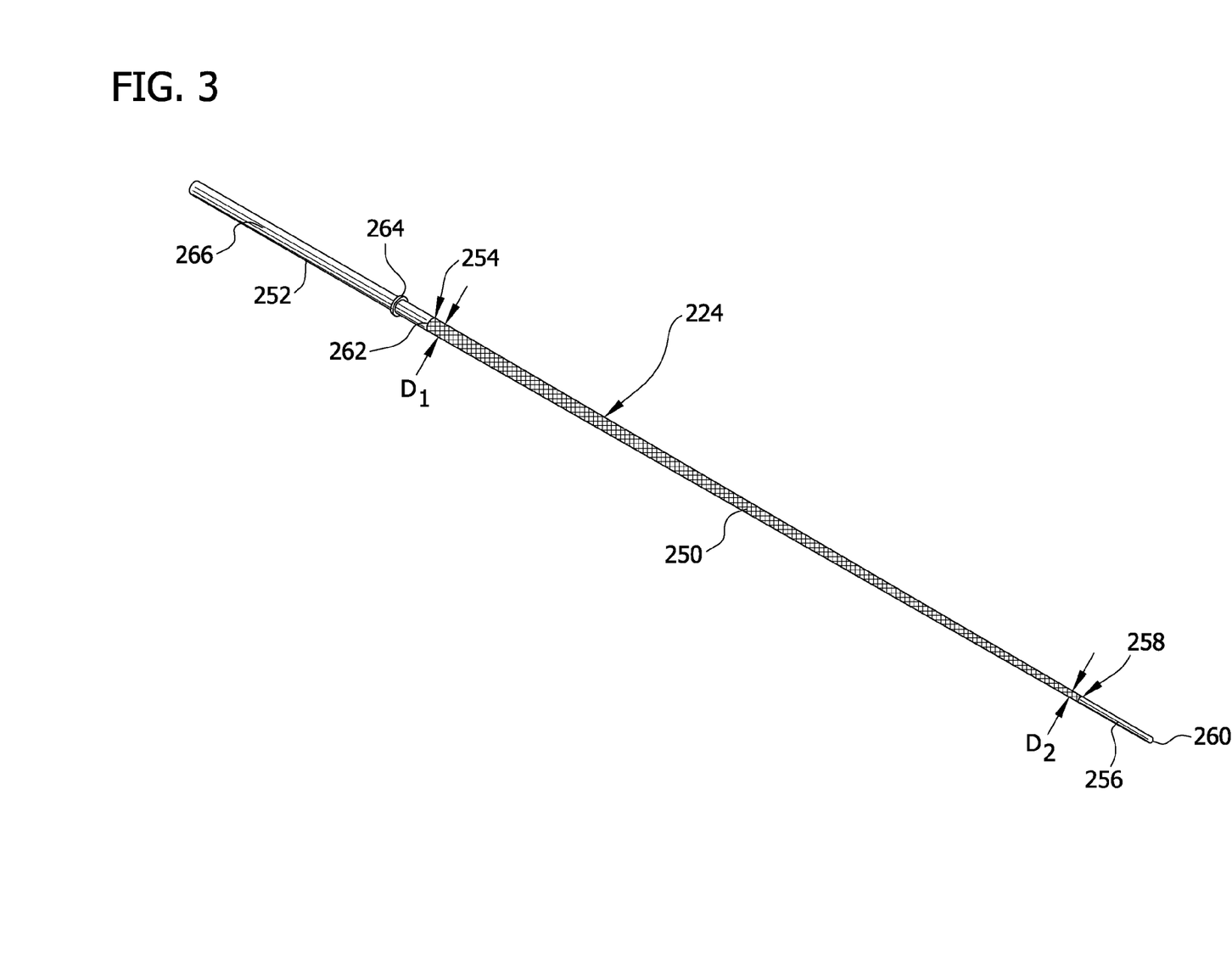
FIG. 3 is a perspective view of an exemplary probe used with the sensor assembly shown in FIG. 2.

FIG. 3 is a perspective view of probe 224 used with sensor assembly 200, shown in FIG. 2. In the exemplary embodiment, probe 224 is a pneumatic-type pressure measurement instrument, i.e. a pitot tube. Alternatively, probe 224 may be any pressure measurement instrument that enables sensor assembly 200 to function as described herein. In the exemplary embodiment, probe 224 includes a support rod 250 that extends between a base shaft portion 252 at a proximal end 254 and a tip portion 256 at a distal end 258. Rod 250 tapers substantially linearly from a proximal end diameter $D_1$ to a distal end diameter $D_2$, such that diameter $D_1$ is wider than diameter $D_2$. In the exemplary embodiment, rod 250 is fabricated from a carbon-fiber composite material. Alternatively, rod 250 may be fabricated from fiberglass, graphite and/or any composite material that provides a high strength-to-weight ratio that facilitates substantially reducing deflectors of probe 224 during operation and which enables sensor system 200 to function as described herein. The composite materials fabricating rod 250 facilitate reducing sensor assembly 200 deflection and fluid flow disturbance when probe 224 is inserted into blade leading edge 204 during testing. Moreover, such materials also provide an increased strength-to-weight ratio of support rod 250 which also facilitates substantially reducing vibrations within sensor assembly 200. As such, more accurate test data may be obtained.

Tip portion 256 extends from rod distal end 258 and is formed with five pressure ports (not shown) spaced about its end 260. In the exemplary embodiment, tip portion 256 is fabricated from stainless steel. Alternatively, tip portion 256 may be fabricated from any material that enables sensor assembly 200 to function as described herein. The pressure ports are positioned in flow communication with pressure scanner 219 (shown in FIG. 2) using a plurality of tubes (not shown) that channel data regarding fluid flow properties gathered from around blade 112 during operation.

In the exemplary embodiment, base shaft portion 252 is substantially cylindrical and extends from rod proximal end 254 such that an interface 262 is defined between base shaft portion 252 and rod proximal end 254. Base shaft portion 252 includes a flange 264 that extends radially outward from an outer surface 266 of shaft 250 and that is positioned adjacent to interface 262. In the exemplary embodiment, base shaft portion 252 is fabricated from stainless steel. Alternatively, base shaft portion 252 may be fabricated from any material that enables sensor assembly 200 to function as described herein.

Figure 4:
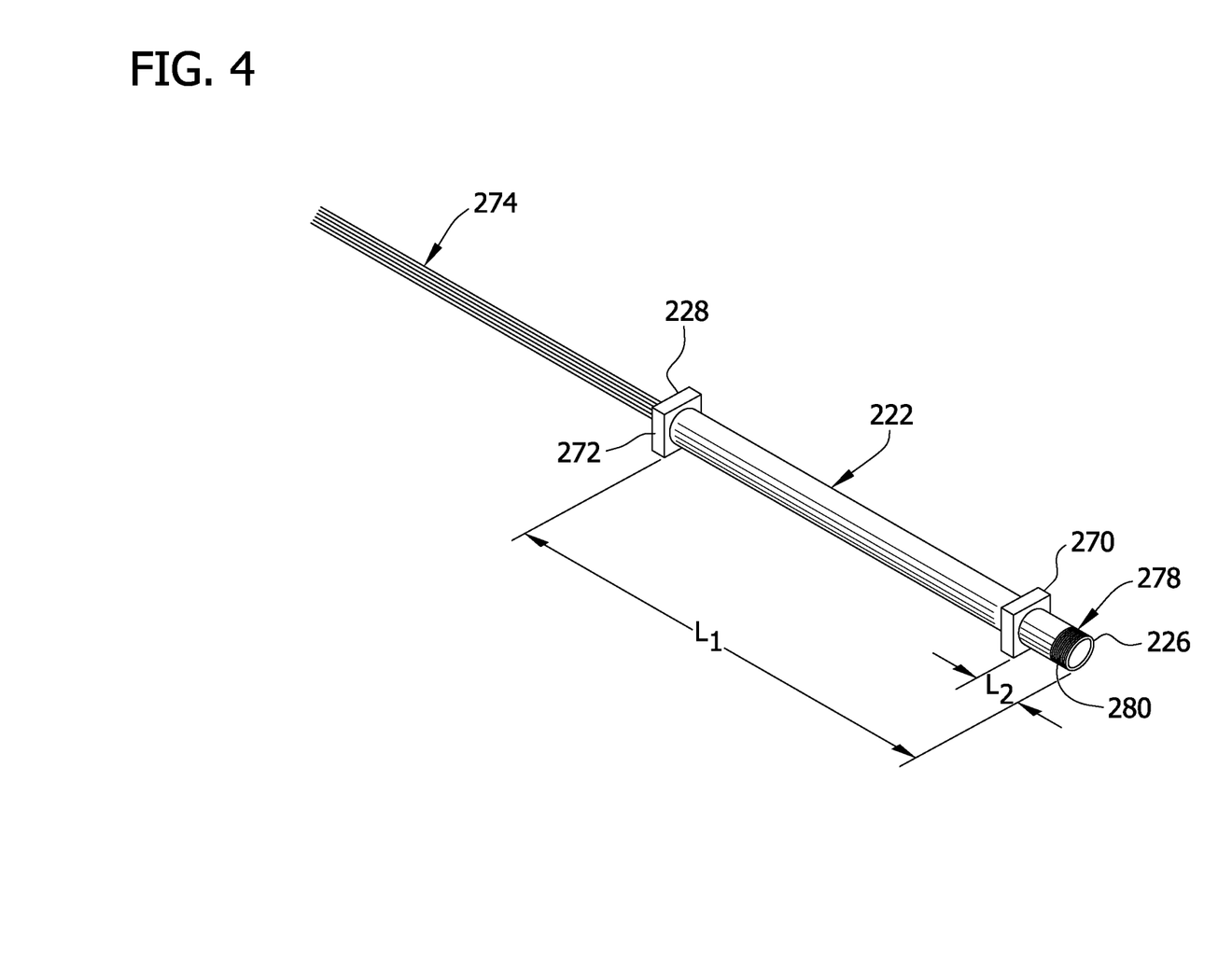
FIG. 4 is a perspective view of an exemplary receptacle used with the sensor assembly shown in FIG. 2.
Figure 5:
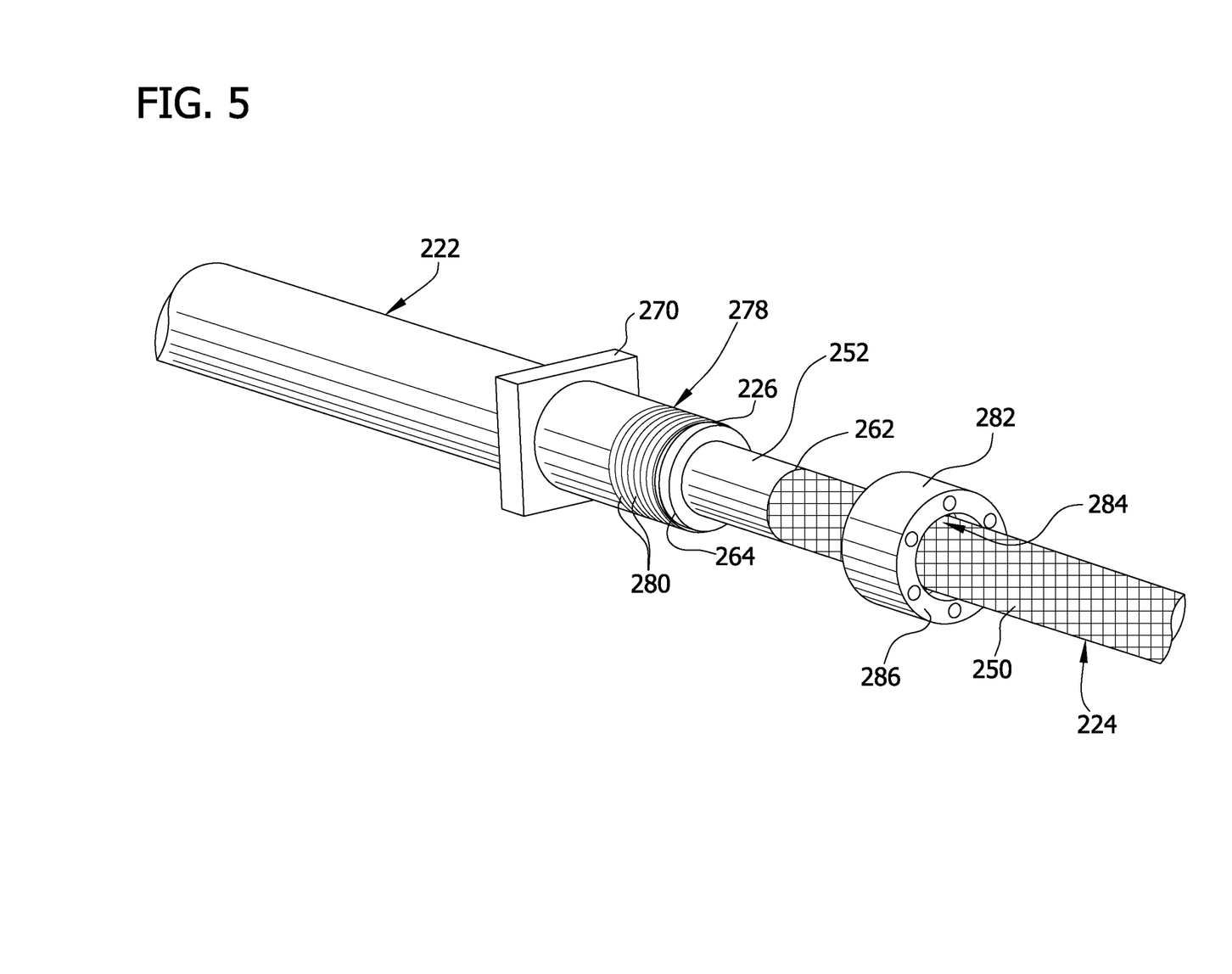
FIG. 5 is a perspective view of the sensor assembly shown in FIG. 2.
Figure 6:
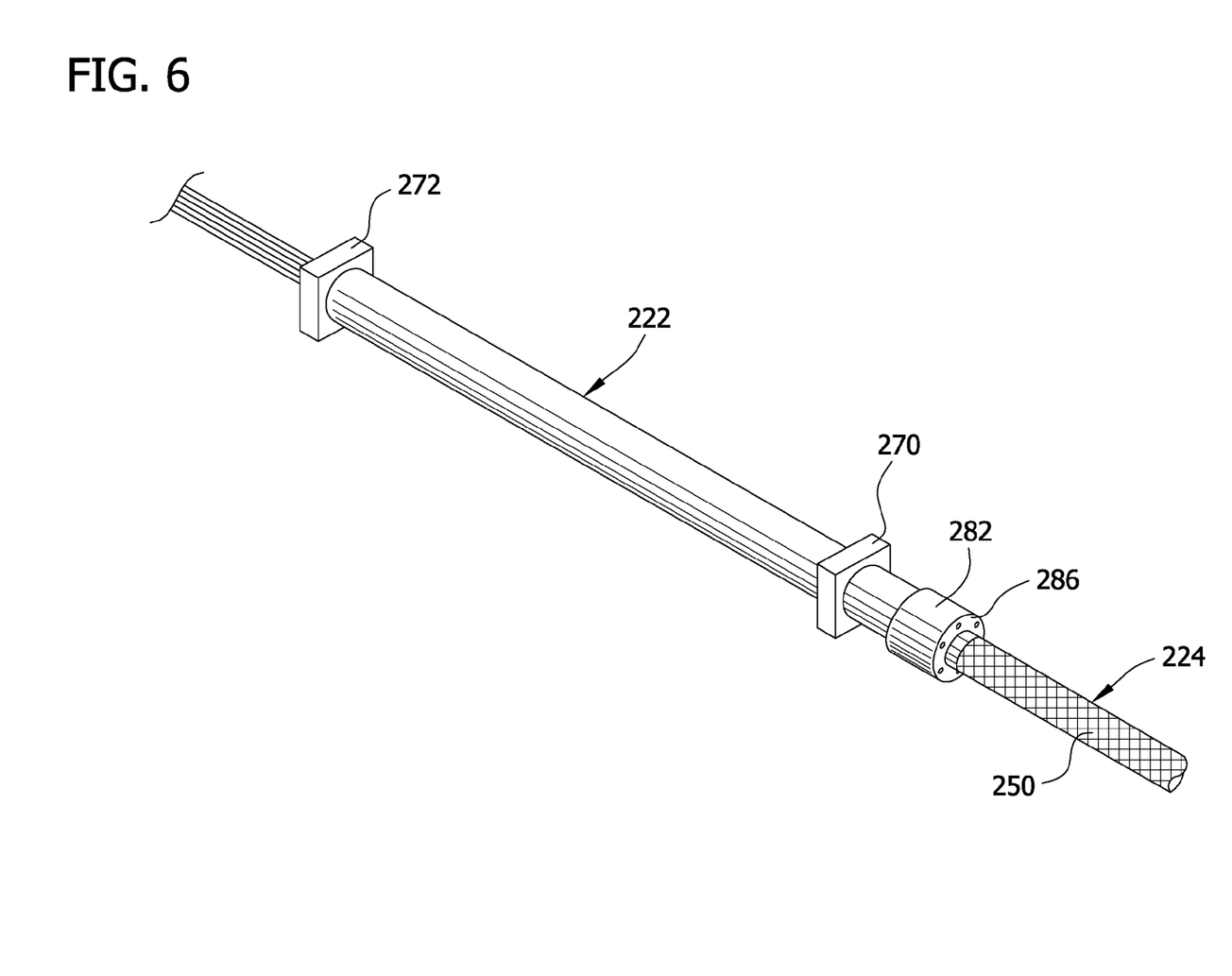
FIG. 6 is a perspective view of an assembled sensor assembly.

FIG. 4 is a perspective view of receptacle 222. FIG. 5 is a perspective view of probe 224 received within receptacle 222, and FIG. 6 is a perspective view of an assembled sensor assembly 200. In the exemplary embodiment, receptacle 222 is substantially cylindrical and extends a length $L_1$ between first end 226 and second end 228. Moreover, in the exemplary embodiment, receptacle 222 is fabricated from stainless steel and is sized, shaped, and oriented to receive base shaft portion 252 in a mating arrangement, as described herein. Alternatively, receptacle 222 may be fabricated from any material that enables sensor assembly 200 to function as described herein.

In the exemplary embodiment, a first alignment flange 270 and a second alignment flange 272 are spaced along length $L_1$ to facilitate aligning and coupling receptacle 222 within blade 112 during assembly. More specifically, first alignment flange 270 is positioned a distance $L_2$ from receptacle first end 226, and second alignment flange 272 is positioned adjacent to receptacle second end 228. Alternatively, any number of alignment flanges 270, 272 or alignment devices may be used to facilitate positioning receptacle within blade 112 during assembly. A plurality of exit tubes 274 extend outward from receptacle second end 228 to facilitate coupling the pressure ports (not shown) defined within tip portion 256 to pressure scanner 219 (shown in FIG. 2).

Moreover, a mating surface 278 adjacent to receptacle first end 226, facilitates coupling receptacle 222 to base shaft portion 252. In the exemplary embodiment, mating surface 278 includes a plurality of threads 280 that are sized and oriented to threadably couple with a nut 282. Alternatively, receptacle 222 may be coupled to base shaft portion 252 using any coupling means such as, but not limited to, welding, clamping, adhesives, and/or with any coupling device that enables sensor assembly 200 to function as described herein.

In the exemplary embodiment, probe 224 is received within receptacle 222 such that flange 264 abuts receptacle first end 226. Nut 282 is formed with an aperture 284 that is sized and oriented to receive probe 224 along tip portion 256 and rod 250 and that enables nut 282 to threadably couple to mating surface 278 to secure probe 224 to receptacle 222. In the exemplary embodiment, after nut 282 is coupled to receptacle 222, an outer surface 286 of nut 282 is substantially flush with blade lead edge 204 to facilitate minimizing degradation of blade performance during testing. Such a system provides a sensor assembly 200 that can be quickly and easily inserted into blade leading edge 204 during testing and removed for normal wind turbine operations.

Figure 7:
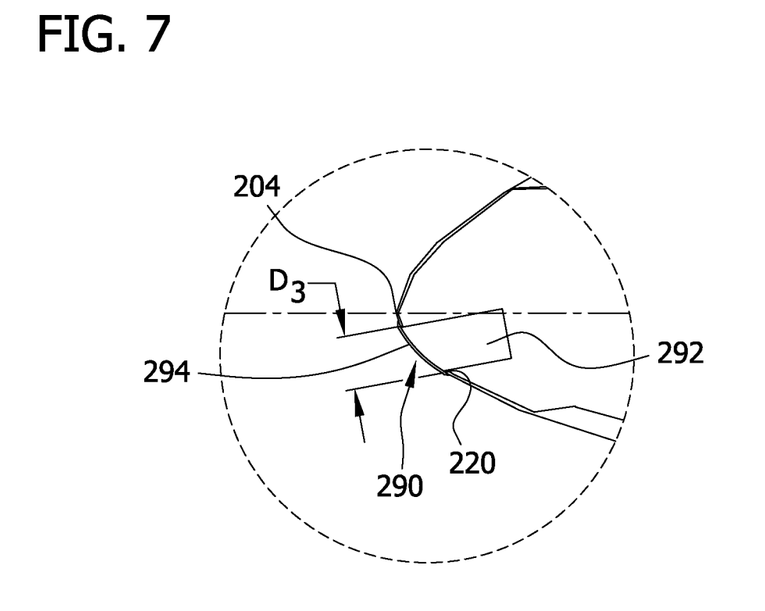
FIG. 7 is an exploded view of section 7 shown in FIG. 2, with sensor assembly removed and an exemplary plug installed.

FIG. 7 is an exploded view of blade 112 with sensor assembly 200 removed and an exemplary plug 290 installed. As described herein, blade leading edge 204 includes aperture 220 that is sized, shaped, and oriented to receive at least a portion of sensor assembly 200 therein. In the exemplary embodiment, after probe 224 has been removed from blade 112, plug 290 is inserted into aperture 220. Plug 290 includes an inner portion 292 and an outer rim 294. Inner portion 292 is sized and shaped to be received within aperture 220 and coupled thereto with a friction fit. Alternatively, inner portion 292 may be retained within aperture 220 via an adhesive, or by any coupling method that enables blade 112 to function as described herein. Rim 294 includes an outer diameter $D_3$ that is sized to prevent plug 290 from being fully inserted within aperture 220. Moreover, diameter $D_3$ provides leverage to enable plug 290 to be removed from aperture 220. In addition, when plug 290 is received within aperture 220, rim 294 contacts leading edge 204 such that a contour of leading edge 204 is substantially maintained. Plug 290 preferably preserves the aerodynamic nature of blade 112, when desired, and is fabricated from a lightweight material.

Exemplary embodiments of wind turbines that include a sensor assembly positioned on the leading-edge of a wind turbine blade are described in detail above. In general, the above-described systems use a tapered rod fabricated from a composite material to support a pitot-tube pressure sensor on the leading-edge of the turbine blade in a cantilevered-type configuration. The use of a composite rod in such systems facilitates increasing the strength-to-weight ratio of the sensor support structure and thus reduces the weight and associated vibration levels compared to known systems that use metallic support structures. Due to the significant reduction in vibration, the system and methods described herein facilitate the collection of data that is more accurate as compared to testing systems that use probes fabricated from heavier, metallic materials. Moreover, the composite rods described herein facilitate substantially reducing sensor deflection and fluid flow disturbance during wind turbine operation, such that measurements taken during testing are enhanced. Additionally, the composite materials provide electrical isolation from lightening or other inducing electrical fields. Moreover, such systems can be easily removed during normal wind turbine operations such that no negative aerodynamic effects are realized. This feature enables a defective probe to be easily replaced, thereby reducing maintenance and labor costs, and system downtime.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor assembly for use with a wind turbine rotor blade that includes a leading edge, said sensor assembly comprising:
    an air data probe comprising a base shaft, a tip, and a rod extending between said tip and said base shaft, said rod fabricated from a composite material; and
    a receptacle configured to couple within the leading edge of the rotor blade for receiving said base shaft therein such that said tip extends a distance outward from the leading edge when said base shaft is received within said receptacle.

2. A sensor assembly in accordance with claim 1, further comprising a fastening mechanism configured to securely couple said base shaft within said receptacle.

3. A sensor assembly in accordance with claim 1, wherein said rod is fabricated from at least one of fiber glass, carbon fiber, and graphite composite.

4. A sensor assembly in accordance with claim 1, wherein said receptacle comprises:
    a first end configured to receive said base shaft therein; and
    a second end configured to couple said receptacle to a blade shear web extending within the rotor blade.

5. A sensor assembly in accordance with claim 4, further comprising a plug sized to be received within said receptacle first end such that a substantially smooth surface is formed along the blade leading edge when said plug is received within said receptacle first end.

6. A sensor assembly in accordance with claim 1, wherein said receptacle is configured to be positioned within the leading edge such that said tip extends obliquely from the blade at an offset angle relative to a blade chord line extending through the rotor blade.

7. A sensor assembly in accordance with claim 1, wherein said receptacle comprises at least one alignment flange configured to secure said receptacle within the rotor blade.

8. A wind turbine comprising:
    at least one rotor blade comprising a leading edge; and
    at least one sensor assembly comprising:
        an air data probe comprising a base shaft, a tip, and a rod extending between said tip and said base shaft, said rod fabricated from a composite material; and
        a receptacle configured to couple within said leading edge of the said rotor blade for receiving said base shaft therein such that said tip extends a distance from the leading edge when said base shaft is received within said receptacle.

9. A wind turbine in accordance with claim 8, further comprising a fastening mechanism configured to securely couple said base shaft within said receptacle.

10. A wind turbine in accordance with claim 8, wherein said rod is fabricated from at least one of fiber glass, carbon fiber, and graphite composite.

11. A wind turbine in accordance with claim 8, wherein said receptacle comprises:
    a first end configured to receive said base shaft therein; and
    a second end configured to couple said receptacle to a blade shear web extending within said rotor blade.

12. A wind turbine in accordance with claim 11, further comprising a plug sized to be received within said receptacle first end such that a substantially smooth surface is formed along the blade leading edge when said plug is received within said receptacle first end.

13. A wind turbine in accordance with claim 8, wherein said receptacle is configured to be positioned within the leading edge such that said tip extends obliquely from the blade at an offset angle relative to a blade chord line extending through the rotor blade.

14. A wind turbine in accordance with claim 8, wherein said receptacle comprises at least one alignment flange configured to secure said receptacle within the rotor blade.

15. A method of assembling a wind turbine comprising:
coupling a receptacle within a leading edge of a rotor blade, wherein the receptacle includes a first end and an opposite second end;
providing an air data probe that includes a base shaft, a tip and a rod extending between the tip and the base shaft, wherein the rod is fabricated from a composite material; and
inserting the probe within the receptacle such that the tip extends a distance from the leading edge of the rotor blade when the base shaft is received within the receptacle.

16. A method in accordance with claim 15, further comprising securing the base shaft within the receptacle using a fastener mechanism.

17. A method in accordance with claim 15, wherein providing an air data probe further comprises fabricating the rod from at least one of fiber glass, carbon fiber, and graphite composite.

18. A method in accordance with claim 15, wherein coupling a receptacle within a leading edge of a rotor blade further comprises coupling a receptacle second end to a blade shear web extending within the rotor blade.

19. A method in accordance with claim 15, wherein coupling a receptacle within a leading edge of the rotor blade further comprises securing the receptacle within the rotor blade using at least one alignment flange.

20. A method in accordance with claim 15, wherein coupling a receptacle within a leading edge of the rotor blade further comprises positioning the receptacle within the leading edge such that the tip extends from the blade at an offset angle relative to a blade chord line extending through the rotor blade.

* * * * *